United States Patent [19]
Robbins, Jr.

[11] 3,761,737
[45] Sept. 25, 1973

[54] THERMOSTAT WITH THERMALLY ISOLATED SWITCH MEANS

[75] Inventor: Nathaniel Robbins, Jr., Edina, Minn.

[73] Assignee: Honeywell Inc., Minneapolis, Minn.

[22] Filed: Aug. 23, 1972

[21] Appl. No.: 283,014

[52] U.S. Cl. ............ 307/117, 219/501, 307/252 B
[51] Int. Cl. ........................................... H01h 37/10
[58] Field of Search ............................. 219/501 A; 174/DIG. 5; 317/100; 165/78; 236/90; 307/116, 117, 149, 252 B

[56] References Cited
UNITED STATES PATENTS

| | | | |
|---|---|---|---|
| 3,614,391 | 10/1971 | Lauck | 219/501 |
| 3,511,972 | 5/1970 | Shaffer, Jr. | 219/501 |
| 3,564,206 | 2/1971 | Lauck | 219/501 |

*Primary Examiner*—Herman J. Hohauser
*Attorney*—Lamont B. Koontz et al.

[57] ABSTRACT

A solid state type of thermostat that utilizes a switch means, such as a triac, for control of a remote ambient temperature altering means is disclosed in a number of possible applications. The solid state switch means or triac generates sufficient heat so that it requires isolation from the balance of the thermostat. In the present invention, the switch is isolated by placing it on a cable and inserting it into a hollow wall, in a conduit stub, or into a conventional mounting box within the wall.

11 Claims, 6 Drawing Figures

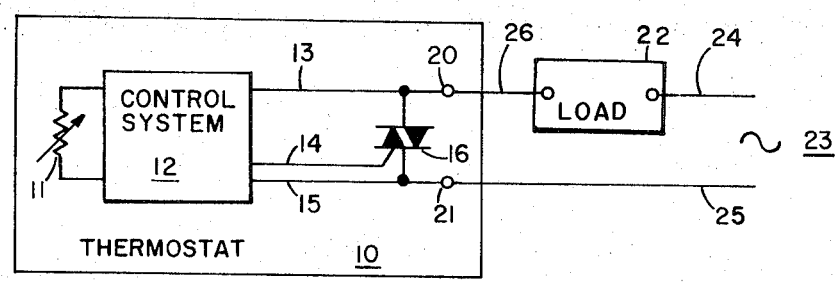
FIG. 1
(PRIOR ART)
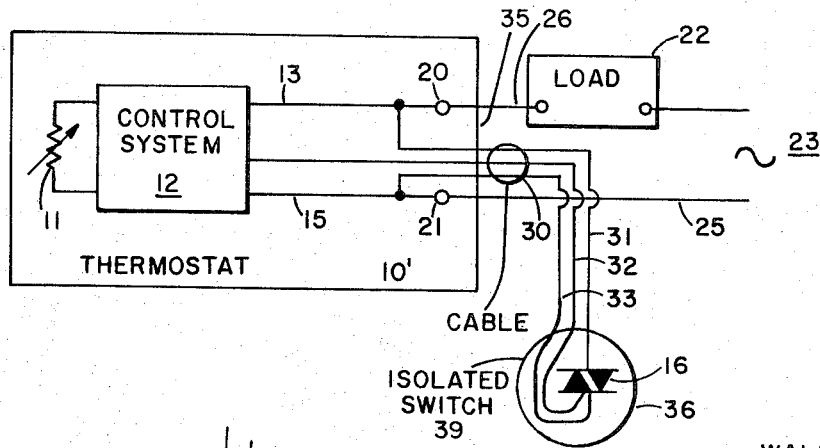
FIG. 2
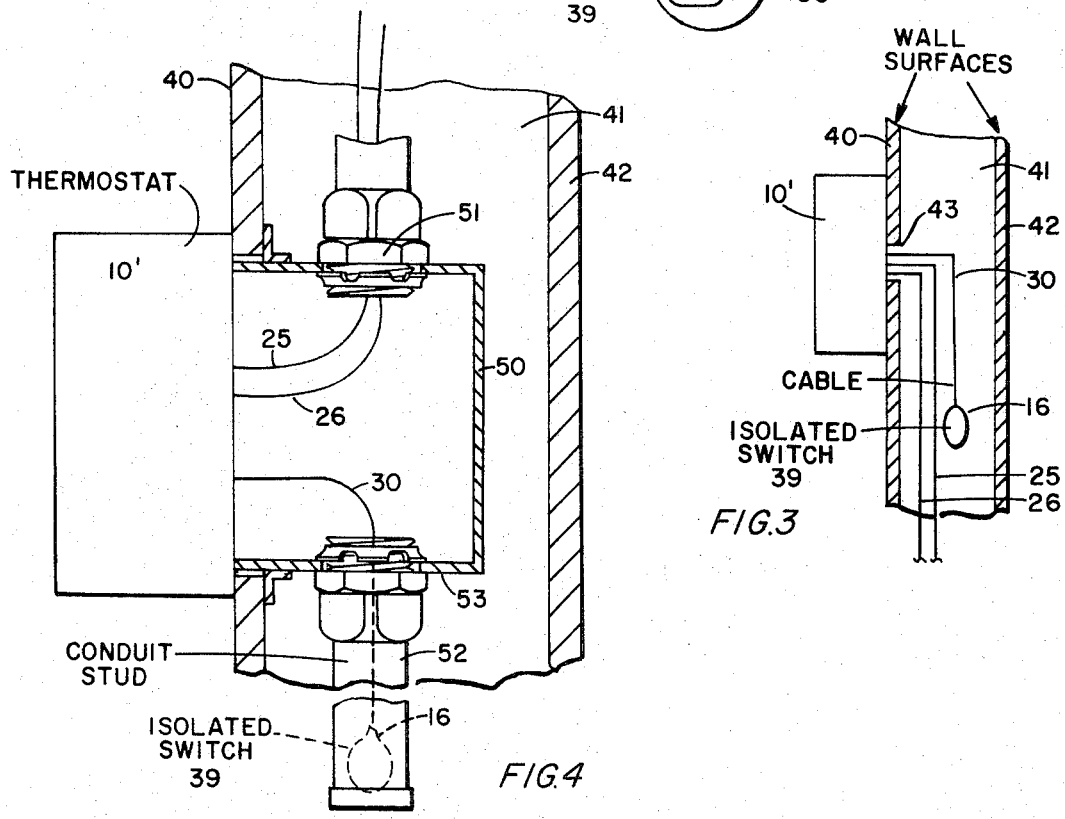

3,761,737

THERMOSTAT WITH THERMALLY ISOLATED SWITCH MEANS

CROSS REFERENCE TO RELATED APPLICATION

The present application is being filed on even date with an application directed to a related invention by Arlon D. Kompelien and which is entitled "Thermostat with Projection for Thermally Isolated Switch Means". Both applications are assigned to the assignee of the present invention.

BACKGROUND OF THE INVENTION

Since the advent of solid state technology and integrated circuits, a large amount of design effort has been placed on improving thermostats by replacing conventional bimetal sensing elements with temperature responsive resistors, such as thermistors. These systems also utilize switch means, such as solid state switches in the form of silicon controlled rectifiers or triacs, as output switch means for the control system within the thermostat itself. The heat generated by the solid state components have a tendency to interact with the temperature sensing element and various design techniques have been used to try and overcome this problem. In some thermostat designs, the temperature sensitive resistor has been isolated in the thermostat housing, by insulating material, and by other similar means. These arrangements have not proved to be wholly satisfactory and the heat generated by the solid state output switches in the thermostat are still considered to be a problem.

SUMMARY OF THE INVENTION

The present invention is directed to an improved thermostat using a solid state output switch which is completely isolated from the balance of the thermostat by placing the switch on a flexible electrical cable or umbilical cord so that the switch can be placed at a location remote from the balance of the thermostat. In the preferred embodiment disclosed, the switch is a triac that is protected by an electrical insulating material, and is hung on a short length of flexible cable so that this isolated switch can be placed into a wall chamber behind the thermostat or into other forms of chambers within the wall structure. This isolates the heat generated by the switch means from the balance of the thermostat. By providing the isolated switch on a short length of flexible cable, any number of convenient installations of a neat and desirable form can be accomplished.

BRIEF DESCRIPTION OF THE DRAWING

FIG. 1 is a schematic representation of a prior art type of thermostat;

FIG. 2 is a schematic representation of the present invention in its broadest form; and FIGS. 3 to 6 disclose four of the many possible applications of the invention disclosed in FIG. 2.

DESCRIPTION OF THE PREFERRED EMBODIMENT

Figure 5:
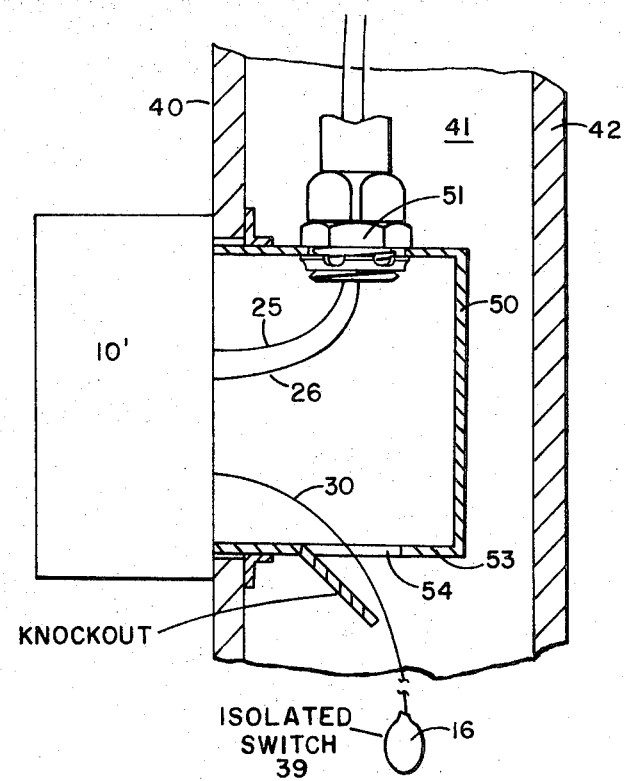

The present invention has particular utility in the solid state thermostat art and can best be understood when a prior art type of device is disclosed, as in FIG. 1. In FIG. 1 a prior art thermostat 10 is disclosed having a temperature sensing element 11, in the form of a negative temperature coefficient resistor, that operates into a control system 12. The control system 12 has three conductors 13, 14 and 15 which are connected to an electric switch means or triac 16. The conductors 13 and 15 also are connected to a pair of terminals 20 and 21 which are connected in turn across the triac 16. A control input for triac 16 is provided on conductor 14. The terminals 20 and 21 are connected through a conventional ambient temperature altering means or load 22, to a source of alternating current potential 23 by conductors 24, 25 and 26. A detailed disclosure of this type of system can be found in a United States patent application, Ser. No. 169,565 filed on Aug. 5, 1971 by B. H. Pinckaers and entitled "Condition Responsive Circuit with Limited Internal Dissipation". Also, this type of prior art thermostat could be of a type disclosed in the U. S. Pat. No. 3,243,609 to A. D. Kompelien. Both the Pinckaers application and the Kompelien patent are assigned to the assignee of the present invention.

The prior art device of FIG. 1 forms a complete thermostat and control system so that the triac 16 is triggered into conduction to energize the load 22 from the alternating current voltage source 23 whenever the negative temperature coefficient resistor 11 indicates a deviation of the ambient temperature from the temperature set into the thermostat 10. This type of thermostat includes the triac 16 within the thermostat housing itself and the heat generated by the operation of triac 16 has been found to undesirably affect the control function of thermostat 10. Isolating the heat generating output switch or triac 16 within the thermostat 10 is very difficult in a small thermostat construction, and has created a substantial design problem.

The present invention, which is completely disclosed in FIG. 2, overcomes this problem. A thermostat 10' in a housing utilizing the same negative temperature coefficient temperature sensor or temperature responsive means 11 and control system or control means 12 is again connected to terminals 20 and 21 by conductors 13 and 15. Once again a load or temperature changing apparatus 22 and a source of alternating current potential 23, along with conductors 24, 25 and 26 are provided.

The electric switch means or triac 16 in the present invention is now provided with a flexible cable means or flexible connection means 30 made up of three conductors 31, 32 and 33. Conductor 31 is connected back to conductor 13, while conductor 33 is connected back to conductor 15. The conductor 32 is an extension of the previously mentioned conductor 14. The cable means 30 extends out of a thermostat housing means disclosed schematically at 35. The cable means 30 is of sufficient length to locate the switch means 16 external of and remotely from the thermostat housing means 35 to isolate the heat generated by the switch means 16 from the temperature sensing element 11. The length of the cable means 30 can be conveniently selected of any desired length which functionally is adequate to isolate the heat of switch means 16 from element 11.

In order to provide protection for the triac 16 an electrical insulating material 36 is provided around the triac 16. This insulating material could be a wrapping of tape, an electrical insulating varnish, or a short length of plastic tubing appropriately attached over the triac 16 and supported entirely by the cable means 30. The electrical insulating material 36 and the triac 16 forms a completely isolated electric switch means 39 that is operated by electric signals transmitted through the cable means 30 and this switch is adapted by its connection to terminals 20 and 21 to control an ambient temperature altering means 22 that is remote from the thermostat 10'.

It is obvious that if the cable means 30 is in the order of one to three feet in length that the heat generated by the operation of triac 16 is completely remote from the thermostat 10' and would not affect the temperature sensing element 11. The cable means 30 and the triac or electric switch means 16 can be conveniently located in a number of configurations, five of which are given by way of convenient example and are not intended as a limitation on the use of the present invention. The arrangement disclosed in FIG. 2 could be mounted on an unfinished or finished wall with the cable means 30 and the isolated switch means 39 merely dangling at a distance that is sufficient to isolate the heat generated in the triac 16 from the sensing element 11.

In a more practical embodiment in a conventional type of construction, the thermostat is disclosed in FIG. 3 at 10' as mounted on a first wall surface 40 that is separated by a stud 41 from a second wall surface 42. The wall surface 40 has a hole 43 through which the cable means 30 is dropped and the isolated switch means 39 is thereby suspended in the hollow of a conventional wall. The power conductors 25 and 26 to the load 22 are disclosed. With this arrangement the novel thermostat 10' is mounted in the ambient to be controlled but any heat generated from the triac 16 is completely isolated in the hollow of the wall. In this way the heat generated by the electric switch means 16 in no way causes any interaction with the temperature sensing element in the thermostat 10'.

In FIG. 4 the thermostat 10' is again disclosed mounted on a wall surface 40 which is separated from the second wall surface 42 by the stud 41. In this particular application a metal mounting box of conventional design 50 is provided with a conduit inlet 51 and the conductors 25 and 26 being provided to the thermostat 10'. The cable means 30 is again provided with the electric switch means 16 enclosed in a short length of conduit 52 which is mounted in the bottom 53 of the box 50. This arrangement can be supplied where needed to meet wiring codes that require conduit installations of low voltage or line voltage thermostat switching.

Figure 6:
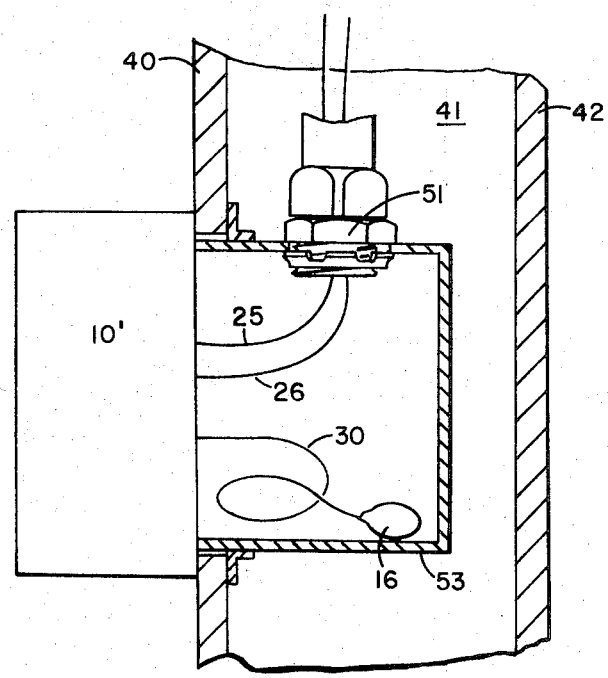

In FIG. 5 the thermostat 10' is again disclosed mounted on a wall surface 40, stud 41, and wall surface 42. Again the box 50 is provided with the conduit 51 and the power connections 25 and 26 along with a knock out 54 and hole 55 being placed in the bottom 53 of the box 50. The electric switch means 16 is again supported on the cable 30 hanging through the hole 55. This arrangement provides for a box mounting of the thermostat 10' on a conventional wall structure but allows for the hanging of the switch means 16 loosely in the wall chamber as opposed to in a conduit stud 52 of FIG. 4. FIG. 6 is a disclosure similar to FIG. 5 except that the flexible conduit means 30 is coiled in the box 50 and laid on the bottom 53 so that the electric switch means 16 lays on the bottom 53 and is substantially out of heat exchange relationship with the sensor 11 in the thermostat 10'.

The examples specifically disclosed in FIGS. 3 to 6 are by way of example of how the invention disclosed in FIG. 2 can be applied and in no way constitutes specific limitations on the invention. The invention is directed to the isolation of the electric switch means 16 by the flexible cable means 30 from the thermostat 10'. It is obvious that many variations of the present invention are possible and the applicant wishes to be limited solely by the appended claims.

The embodiments of the invention in which an exclusive property or right is claimed are defined as follows:

1. A thermostat, including: temperature sensing and control means mounted within thermostat housing means and exposed to an ambient temperature to be controlled; electric switch means electrically connected to said control means by flexible cable means of sufficient length to locate said switch means external of and remotely from said thermostat housing means to isolate heat generated by said switch means from said temperature sensing and control means; and said switch means operated by electric signals transmitted through said cable means with said switch means adapted to control an ambient temperature altering means remote from said thermostat.

2. A thermostat as described in claim 1 wherein said flexible cable means forms the mechanical support for said switch means.

3. A thermostat as described in claim 1 wherein said switch means is solid state switch means.

4. A thermostat as described in claim 3 wherein said switch means is a triac and said cable means is a three conductor cable.

5. A thermostat as described in claim 3 wherein said solid state switch means is enclosed in an electrical insulating material and said cable means supports said switch means and said insulating material.

6. A thermostat as described in claim 5 wherein said solid state switch means is a triac and said cable means is a three conductor cable.

7. A thermostat adapted to be mounted upon a wall surface, including: sensing and control means mounted within thermostat housing means and adapted to be mounted upon a wall surface with said thermostat exposed to an ambient temperature to be controlled; said wall surface having a hole therein with said thermostat housing means adapted to be mounted over said hole; electric switch means electrically connected to said control means by flexible cable means of sufficient length to locate said switch means externally of said thermostat housing means with said switch means and a portion of said cable means extended from said thermostat through said hole to isolate heat generated by said switch means from said temperature sensing and control means; and said switch means operated by electrical signals transmitted through said cable means with said switch means adapted to control an ambient temperature altering means remote from said thermostat.

8. A thermostat as described in claim 7 wherein said switch means is solid state switch means.

9. A thermostat as described in claim 8 wherein said switch means is a triac and said cable means is a three conductor cable.

10. A thermostat as described in claim 8 wherein said solid state switch means is enclosed in an electrical insulating material and said cable supports said switch means and said insulating material.

11. A thermostat comprising,
 a housing adapted to be mounted on a wall in a space wherein the temperature is to be controlled, temperature responsive means mounted in said housing for responding to the temperature of the air in the space,
control means connected to said temperature responsive means and adapted to control temperature changing apparatus for changing the temperature in the space,
said control means having component means which gives off heat during normal operation, and flexible connection means connecting said component means to said control means wherein said component means is adapted to be inserted in the wall remote from said housing and said temperature responsive means whereby said heat can be dissipated in the wall to not adversely effect said temperature responsive means.

* * * * *